UNITED STATES PATENT OFFICE.

RUDOLF HUTZLER, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

TREATING INSOLUBLE INDIGOID DYES.

1,133,031.      Specification of Letters Patent.      Patented Mar. 23, 1915.

No Drawing.      Application filed September 26, 1913. Serial No. 791,949.

*To all whom it may concern:*

Be it known that I, RUDOLF HUTZLER, citizen of the German Empire, residing at Ludwigshafen-on-the-Rhine, Germany, have invented new and useful Improvements in Treating Insoluble Indigoid Dyes, of which the following is a specification.

The specification of German Patent No. 222,191 describes a process for bringing insoluble coloring matters into a state of fine division by treating them, or solutions or suspensions of their components or leuco compounds, with sulfite cellulose waste liquor, and Example 3 of the said specification described a process for blowing air through a hot solution containing indoxyl-carboxylic acid melt and sulfite cellulose waste liquor and then filtering off the finely divided indigo.

I have now found that I can obtain indigoid coloring matters, that is to say, coloring matters of the indigo and thioindigo groups in a colloidal form soluble in water, that is in such a form that the said coloring matters do not settle at all and cannot be separated by filtration from their alkaline or neutral solutions, including solutions such as are produced according to the present invention. In order to secure these results, I pass air through a cold solution of a leuco compound of one of the said coloring matters in the presence of sulfite cellulose waste liquor in the cold, the reaction being carried out so slowly that only an oxidation to, but not a separation of the coloring matter takes place.

A convenient method of carrying out the process according to this invention consists in allowing a thin indigo vat to flow into a solution containing sulfite cellulose waste while well stirring and at the same time passing air through the solution. The resulting solution or product obtained as aforesaid contains the coloring matter in a state of fine division, such that the coloring matter has no tendency to settle out of the solution. This solution can be evaporated or the coloring matter can be precipitated by means of acid without its capability of dissolving in water being lost.

The following examples will serve to illustrate further the nature of my invention and how it can be carried into practical effect, but the invention is not confined to these examples.

Example 1: Allow 60 kilos of a 10% sodium-indigo-white solution (corresponding to 6 kilos of indigotin) to flow at ordinary temperature, while stirring, during a period of 48 hours into 30 liters of sulfite cellulose waste liquor containing about 2,500 grams of cellulose waste and at the same time pass a slow current of air through the solution. The product obtained can, if desired, be filtered to remove impurities, the indigo remaining in the filtrate. This filtrate can, after removing salts, for instance, by means of dialysis, be evaporated; the indigo can then be precipitated from the solution, for instance, by means of acid without its solubility in water being lost. In this example, the indigo-white alkali solution can be replaced by indoxyl alkali solution.

Example 2: Allow 40 kilos of 5% dibrom-indigo-white sodium solution (prepared from 2 kilos of dibromindigo) to flow, during 24 hours, into 30 liters of sulfite cellulose waste liquor containing about 1200 grams of cellulose waste, and cause the oxidation to take place in the way described in the foregoing example. Filter the product through calico, acidify the filtrate with dilute sulfuric acid and then separate the precipitated dye by means of a felt filter. Wash the coloring matter for a short time with pure water on the filter and then extract the product during a period of several days with warm water in an osmotic apparatus for instance, by placing the suspension as taken from the filter in a receptacle with parchment walls, surrounded by another vessel through which warm water is continuously circulating. The deep blue solution obtained can be evaporated to dryness, whereupon a blue powder is obtained which will dissolve again in water to a deep blue solution.

Example 3: Allow 10 kilos of 5% leuco thioindigo solution to flow, during from 4 to 5 hours, into 10 liters of sulfite cellulose waste liquor containing about 200 grams of cellulose waste, and carry out the oxidation as described in the foregoing Example 1. Acidify the red solution with dilute sulfuric acid and separate by means of a felt filter.

Wash with pure water until the filtrate begins to assume a red color and bring the residue into the form of a paste.

Now what I claim is:—

1. The process of producing indigoid coloring matters in a colloidal form soluble in water by passing air through a cold solution of a leuco compound of one of the said coloring matters in the presence of sulfite cellulose waste liquor the air being passed so slowly through the solution that an oxidation to the coloring matter is effected, but a separation of the coloring matter is avoided.

2. The process of producing indigo in a colloidal form soluble in water by passing air through a cold solution of a leuco compound of indigo in the presence of sulfite cellulose waste liquor the air being passed so slowly through the solution that an oxidation to indigo is effected, but a separation of the indigo from the solution is avoided.

In testimony whereof I have hereunto set my hand in the presence of two subscribing witnesses.

RUDOLF HUTZLER.

Witnesses:
J. ALEC. LLOYD,
JOSEPH PFEIFFER.